United States Patent [19]
Bajcar

[11] 3,908,536
[45] Sept. 30, 1975

[54] VACUUMIZING APPARATUS WITH INTERNAL FLOW CONTROL VALVE

[75] Inventor: Miles S. Bajcar, Palos Hills, Ill.

[73] Assignee: Chemetron Corporation, Chicago, Ill.

[22] Filed: Oct. 9, 1974

[21] Appl. No.: 513,206

[52] U.S. Cl. .................................. 99/472; 251/325
[51] Int. Cl.² ......................................... A22C 17/00
[58] Field of Search ................ 99/471, 472; 55/189; 426/486; 251/121, 325

[56] References Cited
UNITED STATES PATENTS
3,464,343  9/1969  Wedekind ............................ 99/472
3,599,556  8/1971  Madsen ............................... 99/472

*Primary Examiner*—Peter Feldman
*Assistant Examiner*—Alan Cantor
*Attorney, Agent, or Firm*—N. M. Esser

[57] ABSTRACT

An apparatus for removing air from meat emulsions or the like wherein the flow of the product via a conduit to the vacuum chamber of the apparatus is regulated by a valve located essentially inside the chamber. The valve, due to its location, is easily removable for conduit clearing and clean up purposes, besides providing improved flow control and therefore, vacuumizing of the product.

10 Claims, 5 Drawing Figures

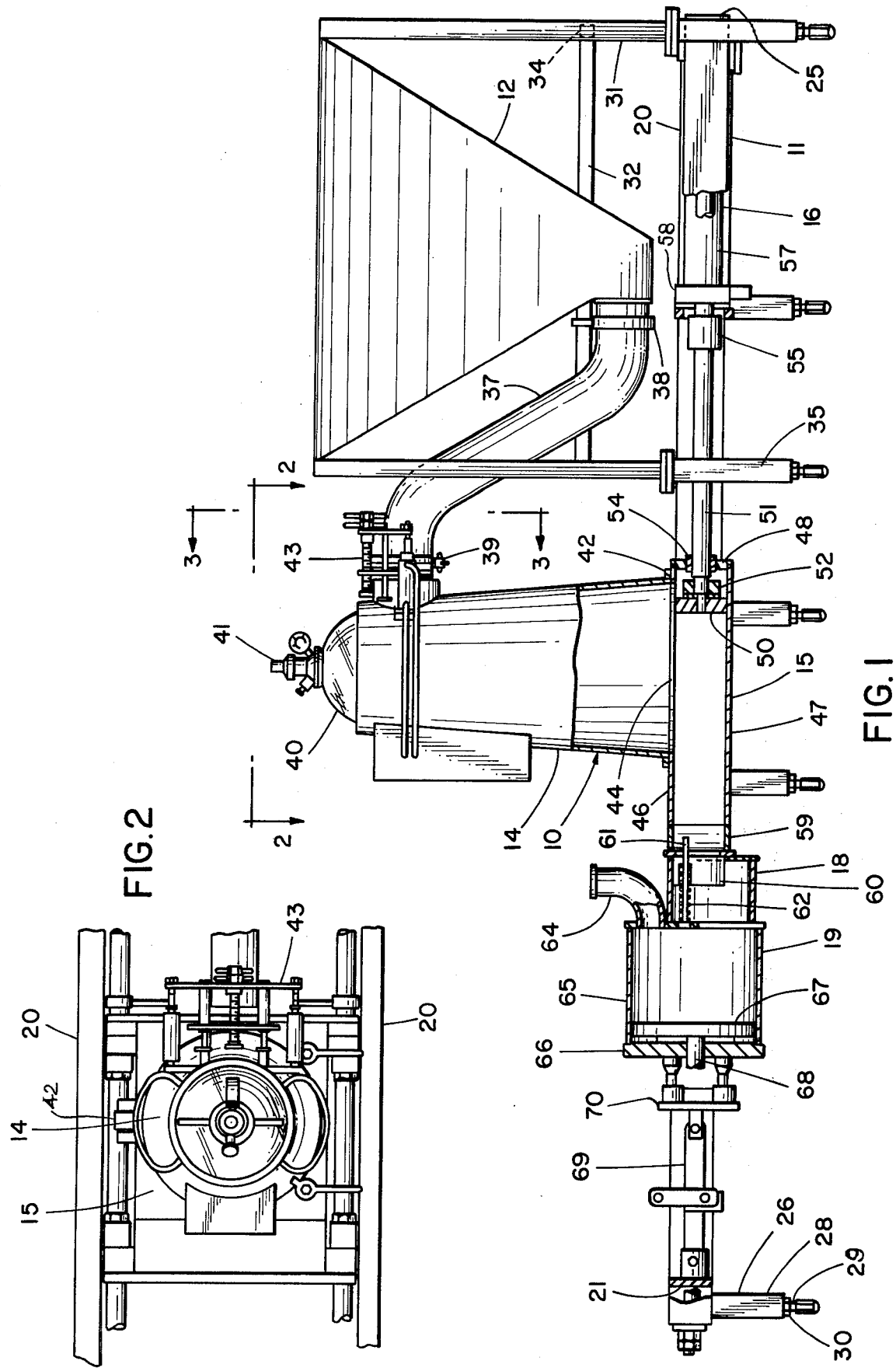

VACUUMIZING APPARATUS WITH INTERNAL FLOW CONTROL VALVE

BACKGROUND OF THE INVENTION

1. Field of the Invention

This invention pertains to vacuumizing apparatuses for food products.

2. Description of the Prior Art

A conventional vacuumizing apparatus utilizes a vacuum chamber that is mounted over a pumping chamber. Associated with the vacuum chamber is a hopper for storing the food product, which may be a meat emulsion, and which is transferred by the force of the vacuum in the chamber, aided by atmospheric pressure in the hopper, through a conduit to the top of the chamber where it falls by gravity into the pumping chamber below, with the air entrained therein being removed in the process. By use of the reciprocatable piston, the vacuumized meat is pumped from the vacuum chamber to a stuffer against a suitable check valve, to prevent return of the meat as the piston retracts, until a desired amount is located therein, whereupon a stuffer piston ejects same to an accumulator. The accumulator may be equipped with stuffing cocks and may be used to fill meat casings therefrom. For desired rate of operation, a metering control valve is included in the conduit between the hopper and the vacuum chamber to regulate the flow of the meat emulsion thereto.

The above noted valve is frequently a pneumatic sleeve valve which constricts when air pressure is exerted, to control the flow rate therethrough. This type valve has proved to be unsatisfactory for several reasons. One reason is that the normal vacuum in the vacuum chamber has a tendency to restrict or close the rubber sleeve even when same is in the open position. Further, clean up of the conduit which may contain 60 lbs. of meat is complicated by having the valve positioned in the conduit. Another reason is that if the meat is chilled for processing, the rubber sleeve tends to be less flexible and therefore less responsive at the resulting lower temperatures.

Substituting a flapper type valve in the conduit has not provided much improvement. The flapper valve causes the rather viscous meat to catch on the edges thereof, which causes intermittent flow, and a tendency for the meat to be imperfectly vacuumized in the restricted area of the conduit rather than thoroughly exposed to the vacuum in the chamber. Also, as a consequence when closed, a full seal cannot be established to maintain high vacuum or prevent product leakage past the valve. Further, the location of the valve in the conduit requires the disassembly of the entire conduit to empty same if vacuumizing is stopped prematurely. Applicant prefers to place a ball at the end of the conduit, which when drawn through the conduit by vacuum will quickly move all of the meat in the conduit into the vacuum chamber. A valve cannot be located in the conduit under these circumstances.

SUMMARY OF THE INVENTION

Applicant has designed a vacuumizing apparatus wherein the flow control valve is mounted essentially in the vacuumizing chamber where the conduit joins same. The above noted ball can then be used for quick clear out of the conduit up to the valve. The sleeve type valve in turn can be quickly dismantled and removed from inside the vacuum chamber with the ball in it for quick clean up. The valve has preferably a side bottom port for a wide, thin, fanlike flow with maximum surface area therethrough of the emulsion for improved vacuumization. The port is adjustable in slot width in regard to the valve body. Preferably the valve is opened and closed by actuating a pair of cylinders. Because the cover on top of the vacuum chamber is clear plastic, the action of the valve and the material being vacuumized can be observed for proper flow rate setting Although the size of the port is preferably adjustable by threaded means, depending on the product being vacuumized, normally the valve is either in an open or closed position. This can be done manually or by use of the above-noted. cylinders by the operator while observing the level of the product in the vacuum chamber or through the use of a probe in the vacuum chamber which will activate or deactivate suitable solenoid valves to operate the cylinders to maintain a desired height of product which should not exceed the port height, in the vacuum chamber in an automatic system.

It is, therefore, an object of this invention to provide a new and improved vacuumizing apparatus with an internal flow control valve.

Another object of this invention is to provide an apparatus with an internal flow control valve that shapes the flow for greater surface exposure and thus improved vacuumization.

Another object of this invention is to provide an apparatus with an internal flow control valve that is quickly removable.

BRIEF DESCRIPTION OF THE DRAWINGS

FIG. 1 is a partly diagrammatical elevational view with portions cut away of the vacuumizing apparatus with internal flow control valve of the invention;

FIG. 2 is a plan view taken along line 2—2 of FIG. 1 of the flow control valve of the apparatus;

DESCRIPTION OF THE PREFERRED EMBODIMENT

Figure 3:
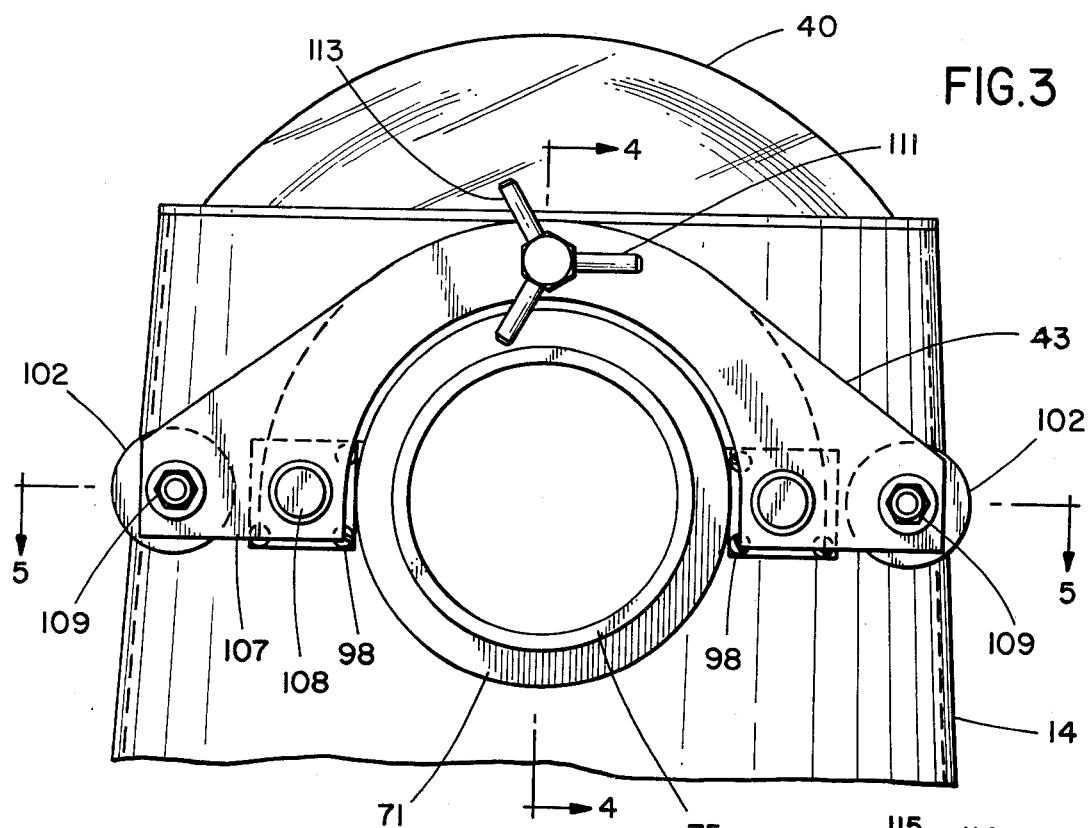
FIG. 3 is a view taken along line 3—3 of FIG. 1.

Referring to FIG. 1, 10 indicates a vacuumizing apparatus with an internal flow control valve. Apparatus 10 includes a base assembly 11, a hopper 12, a vacuum chamber 14, a pumping chamber 15, a pumping assembly 16, a check valve assembly 18, and a stuffer 19.

Base assembly 11 includes rectangular structural members 20 which extend the length of the apparatus 10. Connecting the members 20 at the end opposite hopper 12 is plate 21 welded therebetween. Cross member 25 provides rigidity at the hopper end of the base assembly. Adjustable legs 26 which consist of tubing sections 28 are welded to the underside of the base assembly 11 to provide for leveling of the apparatus. Each section of tubing 28 has a threaded insert welded therein which is engaged by a threaded adjustable leg 29. Hex nut 30 maintains the desired length of leg 29.

Hopper 12 has a conventional tapered configuration formed from sheet steel and is supported primarily by tubing portions 31. Supporting members 32 and 34 provide reinforcement. Legs 35 provide level adjustment and are similarly constructed as legs 26. Hopper 12 has a circular opening formed by a flange having a tapered surface. The flange is constructed to be tightened to a complementary flange of a conduit 37 by a conventional V-type toggle link clamp 38 to provide quick disassembly for clean up purposes. Located at the other end of conduit 37 is a flange also having a tapered surface which is constructed to be tightened to a complementary flange on vacuum chamber 14 by a V-type toggle link clamp 39 which is similar to clamp 38.

Vacuum chamber 14 has a plastic dome or cover 40 which is transparent and can be used by the operator to check the movement of the meat emulsion from the hopper 12 via conduit 37 into the chamber. Cover 40 has a quick connect fitting 41 which is adapted to be connected to the source of vacuum and which also includes a bleed fitting, set vacuum, and a guage. Normally a range of 27.5 to 30 inches HG is maintained in the chamber. Cover 40 is maintained on chamber 14 by the vacuum therein although suitable seals therebetween are also provided. Preferably chamber 14 is constructed in the form of a frustrum cone with annular downwardly diverging walls. It has a lower portion 42 welded thereto which has an end which may be pivotally mounted on pumping chamber 15 for clean up purposes. Chamber 14 may be attached to chamber 15 with seals therebetween by suitable clamps (not shown). Chamber 14 also has mounted therein flow control valve assembly 43 which controls the flow of the meat emulsion into the chamber. Valve assembly 43 is shown in detail in FIGS. 2, 3, 4 and 5 and will be described at length later in this specification.

Referring again to FIG. 1, pumping chamber 15 has a preferably rectangular configuration. Chamber 15 has an opening 44 in its top portion which is aligned with the opening in the lower portion of vacuum chamber 14 for the movement of the product by gravity into the pumping chamber. Chamber 15 has a top wall 46, side walls, bottom wall 47 and end wall 48. Mounted in chamber 15 for reciprocation therein its rectangular shaped piston 50 which includes extension rod 51 mounted in backing plate 52. Rod 51 extends through a sealed opening 54 in end wall 48.

Attached to extension rod 51 is coupling 55 of pumping assembly 16 which is constructed to join rod 51 to the piston rod of hydraulic cylinder 57. Cylinder 57 has one end mounted on a suitable pad on cross member 25 for support and the forward end is attached by means of a flange to the main cross member 58 of the base assembly 11.

The high pressure end of pumping chamber 15 is engaged by converger assembly 59. Converger assembly 59 has preferably a pair of tapered openings leading away from chamber 15 to smoothly guide the product into contact with a pair of valves in check valve assembly 18.

Check valve assembly 18 has a housing with two check valves mounted therein. Each check valve 60 has a pin 61 and a spring 62 which bias the valves to a normally closed position. The check valves prevent the return of the product to the pumping chamber 15 when pumped therefrom by piston 50. Also a part of check valve assembly 18 are two elbows 64 which are adapted to move the food from the later to be described stuffer 19 thru tubing which may have stuffing cocks or automatic valves for filling meat casings, cans, etc.

Stuffer 19 is mounted adjacent check valve assembly 18. Stuffer 19 includes a housing 65 and an end plate 66. Piston 67 mounted on rod 68 is located inside stuffer 19 but also extends outside thereof. A suitable toggle link assembly 69 extending between the end of base 11 assembly and pressure plate 70 is provided to bias stuffer 19, check valve assembly 18 and converger 59 to the high pressure end of chamber 15 during the vacuumizing operation.

Valve assembly 43 of the vacuumizing apparatus 10 is shown best in FIGS. 2, 3, 4 and 5. Chamber 14 has an irregular opening 72 in the side thereof for the prefabricated welded valve body 71. Valve body 71 is inserted in the opening 72 and welded thereto to provide an integral structure with chamber 14. Valve body 71 consists of tubing 74 and a flange 75 welded thereto. The flange is adapted to be joined to conduit 37 by clamp 39. Also welded to valve body 71 a pair of opposed ears 77. An upper block 78 is also a part of valve body 71 and is provided for a later to be described purpose.

Mounted in valve body 71 for movement therein is valve sleeve assembly 80. Assembly 80 includes valve sleeve 81 which is a stainless steel or nickel plated pipe which has suitable grooves 82 for "O" or quad rings 83. Sleeve 81 also has a port 84 extending through the bottom and sides thereof. Preferably port 84 extends approximately 160° of the circumference. If port 84 is larger than 180° the flow of the meat has a tendency to interfere with the free movement of the later to be described valve operating carriage. Port 84, due to its configuration, forces the meat to spread out from the circular flow of the prior art, thus exposing more surface for improved vacuumizing of the meat which falls to pumping chamber 15 below. Attached to sleeve 81 and closing an end thereof is end plate 85. End plate 85 has grooves 86 with quad rings 88 for sealing the area between plate 85 and valve body 71. Also welded to end plate 85 are handles 90 and backing plate 89. Backing plate 89 and the handles 90 are located inside chamber 14 in the valve installed position. Plate 89 has openings 91 in its ends for rods 92 extending therethrough. Each end of rod 92 adjacent plate 89 is removably connected thereto by pins 94. Rods 92 also extend through openings 95 in ears 77 of valve body 71. Seal 96 located in each opening 95 seal the movement of rod 92 therein to prevent loss of vacuum. Plate 98 and suitable retainers hold cartridge and seals 96 in each opening 95. Also mounted in clevis 99 in ear 77 by pin 101 is air cylinder 102 associated with the end of each ear 77.

Carriage assembly 104, aided by the air cylinders 102, is constructed to move valve sleeve assembly 80 and thus valve sleeve 81. Carriage assembly 104 is shown best in FIGS. 2, 3, 4 and 5. Assembly 104 consists of curved spaced plates 106, and 107 joined to rods 108 adjacent the ends thereof. 107 has an opening at each end thereof for the extension therethrough of a rod of air cylinder 102. Hex nut 109 secures the rod of the air cylinder thereto. Inward of the air cylinder, each rod 108 has a hole for the insertion therein of rod 92. Suitable holes through rod 92 and rod 108 for pin 109 allow for the removable attaching of rod 92 to rod 108.

Also mounted on plate 107 is bushing 110 extending through a suitable opening. Adjusting screw assembly 111 includes threaded shaft 112, and knob 113. Knob 113 is rigidly fastened to shaft 113 by pin 114. Knob 115 threaded to shaft 112 serves to lock assembly 111 in set position. Air cylinders 102 are double acting cylinders and are adapted to be connected to a source of power. A suitable valve, not shown, may be utilized to direct air to the cylinders for reciprocation of the attached carriage assembly 104 and the associated valve assembly 80 to control the flow rate of the product from conduit 37 to chamber 14.

In operation, a quantity of a chilled meat emulsion is placed in hopper 12 which may have a capacity of 1200 lbs. or more. Referring to FIG. 1, if toggle link assembly 69 is in the position shown, stuffer 19, check valve assembly 18 and converger assembly 59 are biased tightly against the open, high pressure end of pumping chamber 15. End wall 48 is quick clamped to the other end of pumping chamber 15. Valve sleeve assembly 80 then is moved to the open position by actuation of air cylinders 102 by any suitable means. With these steps taken, the vacuumizing apparatus is ready for operation. The operator then applies to fitting 41 a source of vacuum of 27.5 inches to 30 inches Hg. This vacuum applied to chamber 14 causes the meat emulsion to move from hopper 12, aided by the atmospheric pressure acting on the meat therein, through conduit 37 and valve assembly 43 into chamber 14. The meat emulsion falls by gravity toward the bottom of chamber 14 with vacuum removing the air therefrom. Removal of the air prevents oxidation of the meat to minimize spoilage loss and also improves the density of the product. The meat gradually builds up a head in chamber 14 and also rapidly fills pumping chamber 15 by passing through the opening 44 in the top wall 46 thereof. The operator, by actuation of a suitable valve for hydraulic cylinder 57 reciprocates the piston of same which, via piston 50, pumps the meat in pumping chamber 15 into stuffer 19 past check valves 60. Check valves 60 prevent the return of the meat as piston 50 moves to the retracted position. At some point, piston 50 is held in the retracted position and the operator actuates a suitable valve to send motive fluid, which may be air to move piston 67 to thus move the meat from stuffer 19 out elbows 64 thru tubing not shown. During the vacuumizing process, the operator by looking through transparent cover 40, can observe the level of meat and adjust valve sleeve assembly 80 of valve assembly 43 accordingly. By observing piston rod 68, the determination when to eject the meat from stuffer 19 can also be made. Thus the entire vacuumizing apparatus can be operated manually if desired.

Figure 4:
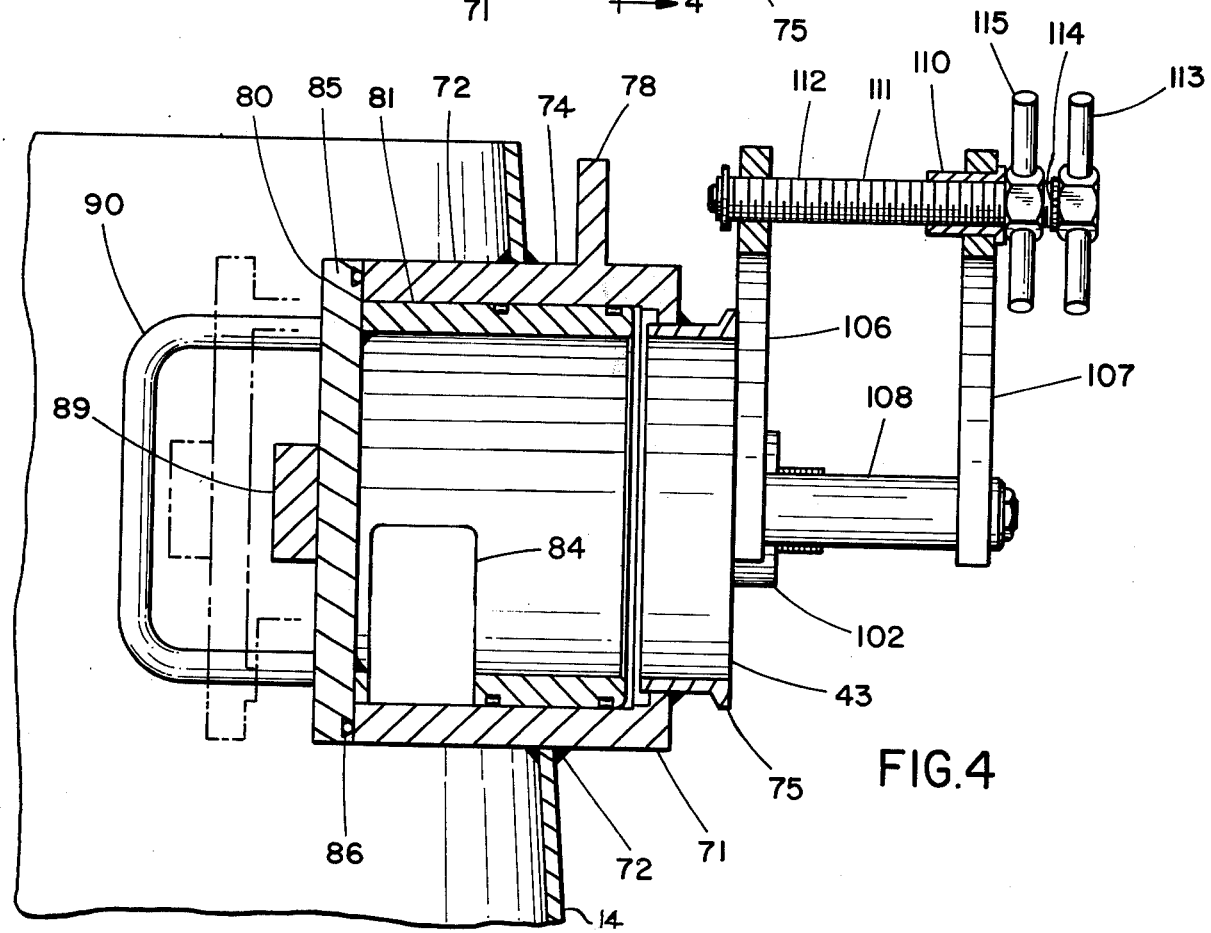
FIG. 4 is a sectional view taken along line 4—4 of FIG. 3.
Figure 5:
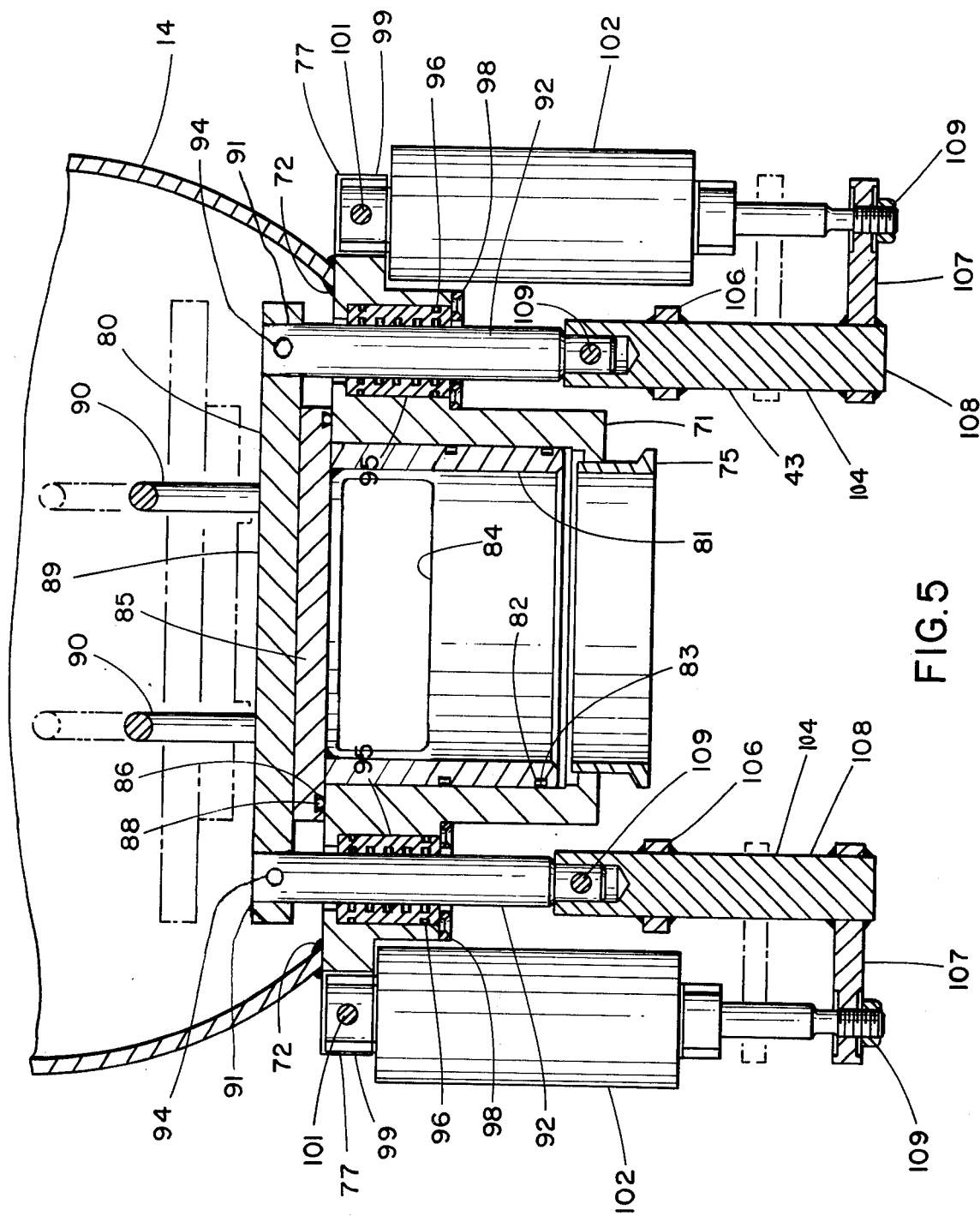
FIG. 5 is a sectional view taken along ling 5—5 of FIG. 3.

Valve sleeve assembly 80 which connects the sleeve 81, plates 85 and 89 and rods 92 is shown in the closed position in FIG. 5 with port 84 located inside valve body 71. If air cylinders 102 are actuated to move carriage assembly 104 which is attached to rods 92 by pins 109 to an open position, as indicated by broken lines, sleeve valve 81 and thus port 84 is moved out from valve body 75 so that meat can therethrough into chamber 14. Referring to FIG. 4, adjusting screw assembly 111 permits the adjustment of sleeve valve assembly 80 so that port 84 is wholly or partially in communication with chamber 14 in the valve open position. Thus, by loosening nut 114, and rotating knob 113, shaft 112 attached thereto is caused to move. Since shaft 112 is restrained by block 78, carriage assembly 104 and attached valve assembly 80 move outwardly from chamber 14 in the valve open position. This adjusts the meat flow through the restricted size of port 84 in regard to valve body 75. Of course, actuation of the air cylinders to move carriage assembly 104 and thus valve assembly to a closed position causes plate 85 in conjunction with seals 86 to prevent meat flow into chamber 14.

At the close of the vacuumizing process conduit 37 can be cleared of any meat remaining therein by manually closing the valve (if not already closed by automatic circuitry). The remaining hopper meat is stuffed by spatula into the bottom opening. When vacuum is re-established, the valve is manually opened and after placing a ball at the bottom of conduit 37 in hopper 12, the ball will be pulled into chamber 14 moving thereto all of the meat in conduit 37. Turning off the vacuum in chamber 14, removing cover 40, removing pins 94 from plate 85, and pulling same into chamber 14 via handles 90, sleeve valve assembly 80 and the ball are removed from chamber 14. Conduit 37 then can be further cleaned or removed by use of clamps 38 and 39. From the foregoing description, it is also apparent that the balance of the vacuumizing apparatus can be quickly dismantled and cleaned. Additionally apparent is the fact that the operation of valve assembly 81 is unaffected by the vacuum in the chamber or the temperature of the meat and that a smooth meat flow is provided by the side port particularly in contrast to a flapper valve arrangement.

Having thus described the invention it will be clear to those skilled in the art that various changes and modifications can be made without departing from the spirit of the invention or the scope of the appended claims.

I claim:

1. In a vacuumizing apparatus which is adapted to remove air from a meat emulsion, of the type comprising: a hopper for storing the meat emulsion, a vacuum chamber adapted to be connected to a source of vacuum, a conduit connecting said chamber and hopper for the passage therethrough of the meat, a pumping chamber connected to said vacuum chamber, a piston adapted to be connected to a source of power and mounted for reciprocation in said pumping chamber, a stuffer in communication with said pumping chamber with a check valve assembly therebetween, and means for moving the meat pumped into said stuffer by said pump piston out of said stuffer, wherein the improvement comprises: a valve movably mounted in said vacuum chamber in communication with said conduit to control the flow of meat through said conduit into said vacuum chamber and means for actuating said valve.

2. The apparatus of claim 1 in which said vacuum chamber has a valve body portion with said conduit connected thereto, and said valve is in the form of a sleeve having a closed end located in said body, said valve having a side port movable with said valve in and out of said valve body to control the flow of meat through said port.

3. The apparatus of claim 2 in which said sleeve side port is located in the bottom of said sleeve.

4. The apparatus of claim 3 in which said side port covers less than 180° of circumference of said sleeve.

5. The apparatus of claim 4 in which a portion of said closed end of said sleeve extends outwardly of said sleeve on opposing sides thereof and further comprising a pair of rods which straddle said sleeve and are removably connected to said portion and extend outwardly through vacuum chamber openings for movement by said actuating means.

6. The apparatus of claim 5 further comprising means for sealing said rods in said chamber openings, and further comprising carriage means removably connected to said rods outside said vacuum chamber.

7. The apparatus of claim 6 in which said actuating means is a pair of cylinders connected to said carriage and said chamber and adapted to be connected to a source of power.

8. The apparatus of claim 7 further comprising adjusting means mounted on said carriage for controlling the position of said port in relation to said valve body to regulate the flow therethrough.

9. The apparatus of claim 8 in which said sleeve end has handle means whereby said sleeve can be moved from said valve body into said vacuum chamber upon disconnection of said sleeve end portion from said rods.

10. The apparatus of claim 9 in which said vacuum chamber has a transparent top for observing the flow of meat emulsion throught said valve.

* * * * *